United States Patent
Ward

(10) Patent No.: US 7,023,925 B1
(45) Date of Patent: Apr. 4, 2006

(54) DATA COMPRESSION UNIT CONTROL FOR ALIGNMENT OF OUTPUT SIGNAL

(75) Inventor: Graham Ward, Working (GB)

(73) Assignee: Snell & Wilcox Limited, (GB)

( * ) Notice: Subject to any disclaimer, the term of this patent is extended or adjusted under 35 U.S.C. 154(b) by 0 days.

(21) Appl. No.: 09/806,969

(22) PCT Filed: Oct. 11, 1999

(86) PCT No.: PCT/GB99/03361

§ 371 (c)(1),
(2), (4) Date: Apr. 6, 2001

(87) PCT Pub. No.: WO00/22830

PCT Pub. Date: Apr. 20, 2000

(30) Foreign Application Priority Data

Oct. 9, 1998 (GB) .................................. 9822087

(51) Int. Cl.
*H04N 7/12* (2006.01)
(52) U.S. Cl. ............................................. 375/240.26
(58) Field of Classification Search ........... 375/240.02, 375/240.1, 240.26; 725/61, 63, 74, 86–87, 725/90, 94–95; 455/3.01, 3.02, 3.04, 3.06; 348/423.1, 425.1, 24; 370/537–538, 468, 370/487, 490
See application file for complete search history.

(56) References Cited

U.S. PATENT DOCUMENTS

| 5,086,488 A | 2/1992 | Kato et al. |
| 5,142,380 A | 8/1992 | Sakagami et al. |
| 5,249,053 A | 9/1993 | Jain |
| 5,438,625 A | 8/1995 | Klippel |
| 5,512,956 A | 4/1996 | Yan |
| 5,629,779 A | 5/1997 | Jeon |
| 5,642,115 A | 6/1997 | Chen |
| 5,671,298 A | 9/1997 | Markandey et al. |
| 5,748,245 A | 5/1998 | Shimizu et al. |
| 5,802,218 A | 9/1998 | Brailean |
| 5,812,197 A | 9/1998 | Chan et al. |
| 5,831,688 A | 11/1998 | Yamada et al. |
| 5,835,493 A * | 11/1998 | Magee et al. .......... 370/395.62 |
| 5,859,660 A * | 1/1999 | Perkins et al. ................. 725/32 |
| 5,917,830 A * | 6/1999 | Chen et al. .................. 370/487 |
| 5,930,398 A | 7/1999 | Watney |
| 5,991,456 A | 11/1999 | Rahman et al. |
| 6,005,952 A | 12/1999 | Klippel |
| 6,101,195 A * | 8/2000 | Lyons et al. ................. 370/498 |

(Continued)

FOREIGN PATENT DOCUMENTS

EP 0589657 3/1994

(Continued)

OTHER PUBLICATIONS

Brightwell et al., "Flexible switching and editing of MPEG-2 video bitstreams", International Broadcasting Convention, pp. 547-552, Sep. 1997.*

(Continued)

*Primary Examiner*—Vu Le
(74) *Attorney, Agent, or Firm*—Michael Best & Friedrich LLP

(57) ABSTRACT

To enable a single programme in a multiple programme MPEG transport stream (MPTS) to be replaced seamlessly by a locally generated programme, the local coder received the MPTS as a reference signal and outputs transport packets in alignment with the packets of the programme to be replaced. Timing and other packet parameters are also copied.

3 Claims, 7 Drawing Sheets

U.S. PATENT DOCUMENTS

| | | | |
|---|---|---|---|
| 6,151,362 A | 11/2000 | Wang | |
| 6,163,573 A | 12/2000 | Mihara | |
| 6,208,691 B1 * | 3/2001 | Balakrishnan et al. | 375/240.12 |
| 6,208,759 B1 * | 3/2001 | Wells | 382/232 |
| 6,269,120 B1 | 7/2001 | Boice et al. | |
| 6,278,735 B1 | 8/2001 | Mohsenian | |
| 6,285,716 B1 * | 9/2001 | Knee et al. | 375/240.28 |
| 6,351,471 B1 * | 2/2002 | Robinett et al. | 370/468 |
| 6,414,998 B1 * | 7/2002 | Yoshinari et al. | 375/240.25 |
| 6,437,827 B1 | 8/2002 | Baudouin | |
| 6,487,721 B1 * | 11/2002 | Safadi | 725/36 |
| 6,529,550 B1 * | 3/2003 | Tahara et al. | 375/240 |
| 6,539,120 B1 | 3/2003 | Sita et al. | |
| 6,570,922 B1 | 5/2003 | Wang et al. | |
| 6,674,802 B1 * | 1/2004 | Knee et al. | 375/240.26 |
| 2001/0031009 A1 | 10/2001 | Knee et al. | |
| 2002/0064177 A1 * | 5/2002 | Bertram et al. | 370/458 |

FOREIGN PATENT DOCUMENTS

| | | | |
|---|---|---|---|
| EP | 0765576 | * | 6/1997 |
| EP | 0913058 | * | 5/1999 |
| GB | 2327548 | | 1/1999 |
| WO | WO 97/08898 | | 3/1997 |

OTHER PUBLICATIONS

Defrance, S., "Switching MPEG 2", IEE Colloquium on MPEG-2: What it is and What it isn't, pp. 7/1-7/3, Jan. 24, 1995.*

O'Grady et al., "Real-time switching of MPEG-2 bitstreams", International Broadcasting Convention, pp. 166-170, Sep. 1997.*

Talreja et al., "Editing techniques for MPEG multiplexed streams", Proceedings, IEEE International Conference on Multimedia Computing and Systems, pp. 278-285, Jun. 1997.*

Birch, C.H., "MPEG splicing and bandwidth management", International Broadcasting Convention, pp. 541-546, Sep. 1997.*

Weiss, S.M.; "Switching Facilities in MPEG-2: Necessary But Not Sufficient", SMPTE Journal, U.S. SMPTE Inc. White Plains, NY; vol. 104, No. 12, Dec. 1, 1995, pp. 788-802.

* cited by examiner

DATA COMPRESSION UNIT CONTROL FOR ALIGNMENT OF OUTPUT SIGNAL

This invention relates to data compression and especially to the compression of digital television signals.

The example will be taken of the well-known MPEG-2 compression scheme. In television production, distribution and transmission, there are a variety of operations which require to be performed on MPEG-2 transport streams without adversely affecting the performance of—for example—downstream MPEG-2 decoders. The term "transport stream" is used here to include both single-programme transport streams (TS) which comprise elementary streams of—for example—video, audio and data, and multi-programme transport streams (MPTS) which comprise two or more single-programme transports streams and—optionally—data or other services.

A frequent requirement is to receive a nationally distributed MPTS and to replace one of the programmes with a locally produced programme. Similarly, it is frequently required to insert local advertisements or announce programmes. A procedure exists for performing these types of operations, but the procedure is cumbersome and lacks flexibility. Briefly, the programme to be replaced within the nationally distributed SPTS is constructed so as to have within it a number of splice points. At these splice points, the group of picture (GOP) structure, the video buffering verifier delay and certain other parameters are constrained. Specifically, the GOP structure will be arranged so that the last picture (in presentation order) before an out point is either a non-predicted I-frame or a forward only predicted P-frame. The video buffering verifier delay (which corresponds with the buffer occupancy in the downstream decoder) will take a predefined value. The bitstream which is to be inserted at the splice point will then be arranged to start with an I-frame and to have an initial value for the video buffering verifier delay which is equal to the same predetermined value. This is cumbersome; moreover, it is generally not possible to switch the bit-stream at anywhere other than the splice points.

It is one object of the present invention to provide improved method and apparatus which overcomes or ameliorates the difficulties associated with prior art techniques.

Accordingly, the present invention consists in one aspect in a method of controlling a compression unit which outputs a compressed bit-stream, the method comprising the steps of supplying to a reference input of the compression unit, a transport stream input with a sequence of transport packets; nominating a set of the transport packets as reference packets and arranging for the compression unit to output packets in alignment with the reference packets.

Suitably, the transport stream comprises a multi-programme transport stream and wherein the nominated set of transport packets comprises those packets associated with a selected programme. The nominated set of transport packets will typically comprise sub-sets of packets, those sub-sets being associated with respective video, audio, data and service information elementary streams of the selected programme.

Advantageously, each compression unit is arranged to output packets having at least one parameter determined by the reference packet with which it is in alignment. Those parameters may include: a clock reference such as the MPEG-2 Programme Clock Reference (PCR); the location of video and audio frame starts; time stamps such as the MPEG-2 Presentation Time Stamps (PTS) and Decode Time Stamps (DTS); and a delay value such as the MPEG-2 Video Buffering Verifier (VBV) delay.

In a different aspect, the present invention consists in a method of replacing a programme within a multi-programme transport stream by the output of a programme compression unit, comprising the steps of supplying the multi-programme transport stream to a reference input of the compression unit, nominating as reference packets those packets which are associated with the programme to be replaced; arranging for the compression unit to output packets in alignment with the reference packets; and re-multiplexing the output of a programme compression unit with the remaining packets of the multi-programme transport stream.

In one arrangement according to this invention, there is proposed the use of a "reference" MPEG-2 bit-stream input to an MPEG-2 encoder, such that the output of the encoder is controlled by this "reference" input. This input is in addition to and in parallel with the other customary inputs to an encoder.

The "reference" MPEG-2 bit-stream input could be regarded as the MPEG-2 equivalent of the "genlock" synchronisation input common on equipment handling uncompressed video. The latter input is used to force the equipment's output to conform with the timing of one particular video signal, whereas the "reference" MPEG-2 bit-stream input is used to force the output of the MPEG-2 encoder to conform with timing and/or other aspects of one particular programme within the multiplex carried by a particular MPEG-2 transport stream signal.

This capability is potentially useful in all multi-programme applications of MPEG-2—for example—where MPEG-2 encoders and decoders are cascaded; where individual MPEG-2 programmes are to be added, substituted or otherwise combined together, or where a non-MPEG-2 programme is to be added, substituted or otherwise combined with programmes within an MPEG-2 transport stream.

For example, if one programme is to be substituted for another within a multi-programme MPEG-2 transport stream which has already been encoded (i.e. it is from "upstream" of the switch system) whilst it is "on-air", MPEG-2 decoders "downstream" of the switch system are very likely to produce noticeable artefacts unless the following critical timing-related MPEG-2 parameters are consistent before and after the switch:

Access Unit (AU) timing,
Programme Clock References (PCRs),
Decode Time-Stamps (DTSs),
Presentation Time-Stamps (PTSs), and
Video Buffering Verifier delay ("vbv_delay").

An MPEG-2 encoder can make these critical parameters consistent with another MPEG-2 programme from "upstream" if that MPEG-2 encoder has a "reference" MPEG-2 bit-stream input.

As a second example, it may be beneficial to make the Elementary Stream (ES) bit-rates within a programme being encoded dependent on the bit-rates of one or more other programmes from "upstream". Applications which would benefit from this include various forms of statistical multiplexing and the substitution of one programme for another within a multi-programme MPEG-2 transport stream, without the use of a full (scheduling) MPEG-2 remultiplexer and even where the multi-programme MPEG-2 transport stream has a fully-occupied payload capacity. An MPEG-2 encoder can make the ES bit-rates consistent with another MPEG-2 programme if it has a "reference" MPEG-2 bit-stream input.

The only external "references" on conventional MPEG-2 encoders are external clock signals from which ES bit-rates and/or total programme bit-rate can be derived. This allows bit-rates to be set with high accuracy, which would allow one MPEG-2 encoder to have bit-rates very close to those of another MPEG-2 encoder. The "reference" MPEG-2 bit-stream input according to one aspect of this invention allows bit-rates to be matched exactly with those from "upstream" encoders. It also allows other MPEG-2 parameters to be matched. It is the exactness of the matching and the ability to match other parameters (such as PCR's) that make this aspect of the invention so powerful.

The nature of the compression unit will depend upon the circumstances. If, for example, a regional opt-out is required, the compression unit will be a full encoder receiving the regional programming as live video. If, in another example, locally-targeted advertisements or announcements are to be inserted, these may exist on a server as pre-encoded streams. The compression unit will in that instance be a transcoder.

Conventional statistical multiplexing employs control paths extending from the multiplexer to the individual coders, allocating available bit rate to the respective coders whilst ensuring that the fixed bit rate for the multiplex is not exceeded.

This invention provides an alternative arrangement which has certain important advantages.

Accordingly, the present invention consists in another aspect in apparatus for forming a multi-programme transport stream having a fixed overall bit rate and in which the instantaneous allocation of that bit rate amongst the programme transport streams is controllable, comprising a plurality of programme compression units each having a reference input; a controller which generates a transport stream reference having sets of reference packets associated respectively with the respective compression units, in which the relative occurrence of packets of the respective sets reflects the desired instantaneous allocation of that bit rate amongst the programme transport streams, each compression unit receiving the transport stream reference and being arranged to output packets in alignment with the reference packets associated with that compression unit and a multiplexer which combines the outputs of the respective programme compression units to from a multi-programme transport stream.

The reference transport stream which is passed to all compression units can usefully be regarded as a protocol for controlling a statistical multiplexing operation. The outputs of the compression units (which can be encoders or transcoders or a mix of these) can then be passed to a conventional but non-statistical multiplexer. This will be convenient if—for example—encryption is required to be added in the multiplexer. In simpler arrangements, because the outputs of the respective compression units are aligned with different sets of reference packets and are thus never coincident, it will be possible to combine the streams by a simple OR'ing operation.

The invention will now be described by way of example with reference to the accompanying drawings, in which.

Before describing in detail specific embodiments of the present invention, it will be helpful to mention briefly a related technology which is particularly useful in combination with the present invention.

It is now recognised that problems associated with cascaded encoding and decoding processes can be very much reduced (if not eliminated) if a downstream encoder has available to it certain of the coding decisions employed by the upstream encoder. These decisions may be carried in an information bus which typically extends from an MPEG-2 decoder to an MPEG-2 encoder. The information bus can with great advantage be carried within the video signal itself. For a more detailed explanation, reference is directed to EP 0 765 576 and EP 0 913 058.

Figure 1:
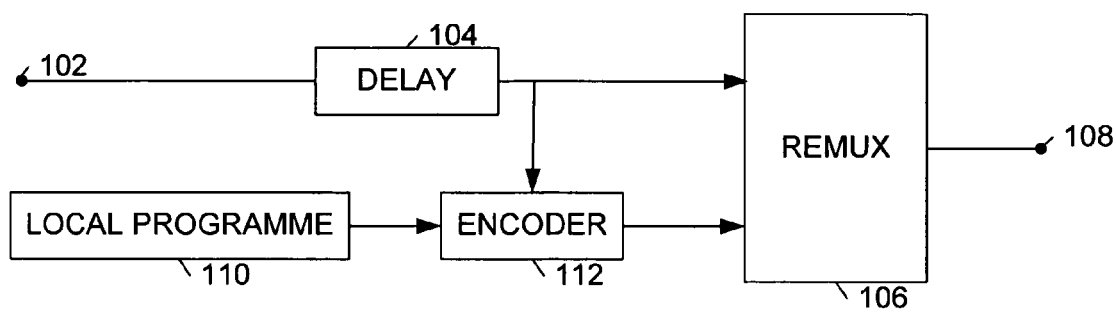
FIG. 1 is a block diagram illustrating one embodiment of the present invention for performing a local opt-out.

Referring now to FIG. 1, there is illustrated apparatus for performing a local programme opt-out. Here, one programme (the "local" programme) is substituted for another (the "original" programme) within a multi-programme MPEG-2 transport stream broadcast.

The incoming multi-programme transport stream is received at terminal 102, passing through an MPEG delay 104 to a remultiplexer 106. This provides a multi-programme transport stream output at terminal 108. Where no local opt-out is in force, the input multi-programme transport stream (MPTS) passes seamlessly to the output 108, subject only to a delay.

A source of local programming is shown at 110 and this provides the input to a compression encoder 112. It will be understood that if the compression encoder 112 were of conventional form, any attempt in the remultiplexer to substitute the locally encoded programme for one of the programmes in the MPTS, would almost certainly produce severe artefacts, if not crashing, in downstream decoders.

According to the present invention, the encoder 112 received as a reference input the multi-programme transport stream. This reference input is used—in ways that will be described—to control the encoder 112 so that its output can be substituted seamlessly for a designated programme in the MPTS.

Figure 2:
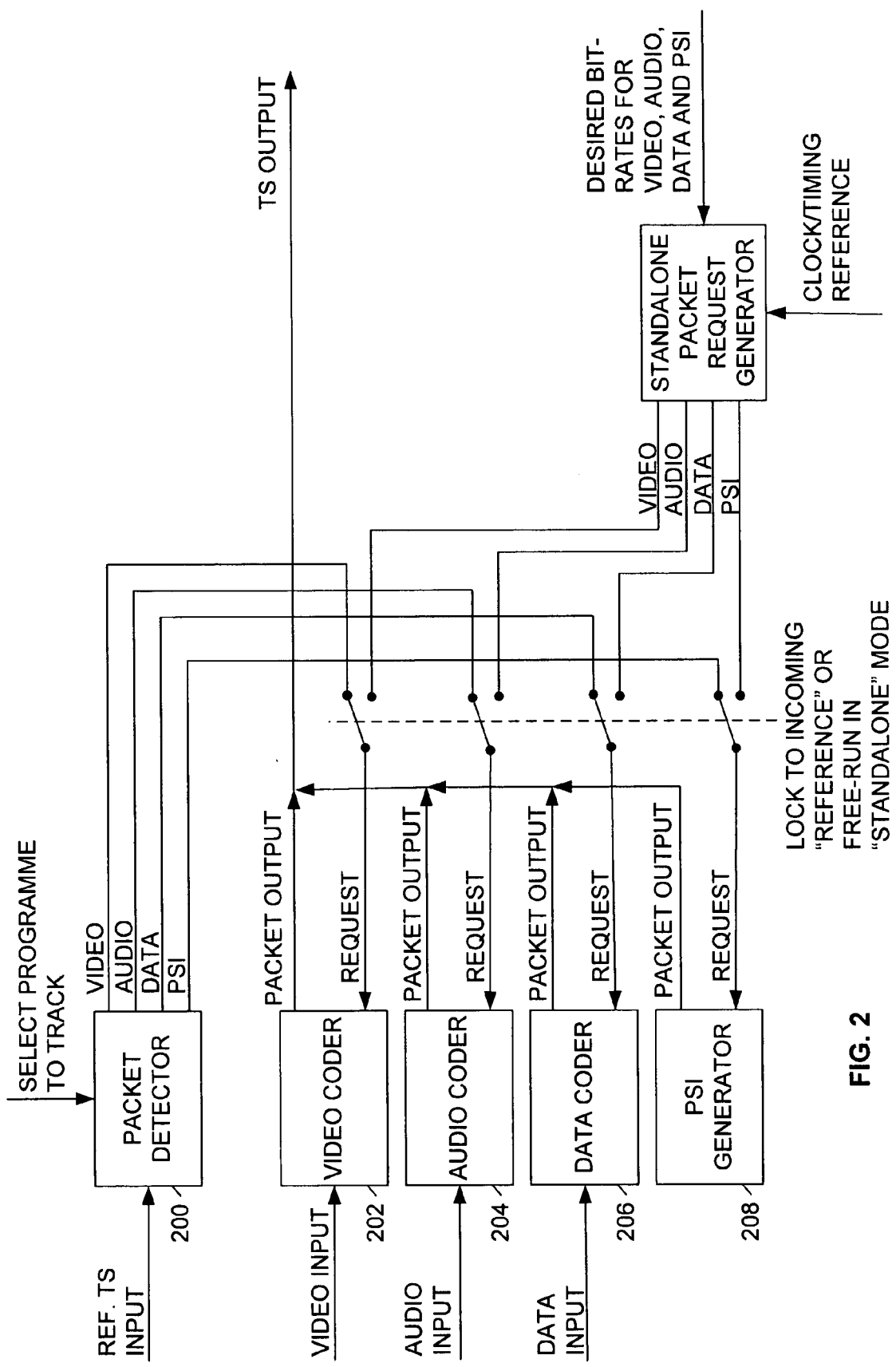

Reference is now directed to FIG. 2 which illustrates one of the processes inside the encoder 112 utilising the reference transport stream input. Thus a packet detector 200 receives the reference transport stream input together with an indication of which programme in the multi-programme transport stream, is to be replaced and which the packet detector is therefore required to track. The packet detector 200 then provides for each of the elementary streams of the tracked programme, an indication of the location of the associated packets in the MPTS.

The encoder 112 includes a video coder 202, an audio coder 204 and a data coder 206. These coders receive video, audio and data inputs, respectively. The encoder further includes a PSI generator 208.

The video elementary stream will be taken as an example; it will be apparent that the remaining elementary streams are treated in analogous fashion.

The video coder 202 is arranged to proved a packet output when it receives a packet request. The corresponding output from the packet detector 200 will normally provide such requests so that the video coder 202 will provide packets which are aligned with those packets in the reference transport stream which correspond with the video elementary stream of the tracked programme. To enable the encoder to function in the absence of a reference transport stream input, a stand-alone packet request generator is provided.

This has a clock-timing reference input and a further input which sets the desired bit-rates for the various elementary streams. The packet request generator provides an output for each of the elementary streams and there is a notional ganged switch arrangement which enables the elementary stream coders to be locked either to the incoming reference transport stream or to free run in a stand-alone mode under control of the stand-alone packet request generator.

It will thus be seen that "reference" packets in the MPTS (that is to say the packets associated with the elementary stream which is to be replaced by the output of a specific coder) are provided to the coder to ensure that the packets which are output by the coder are in alignment with those reference packets. In the normal case, this will be a temporal alignment although it will be understood that in certain non-real time processes, the alignment will be according to a measure which is related to time. The reference packets are used additionally to control certain parameters in those packets which are output in alignment with the reference packets.

Figure 3:
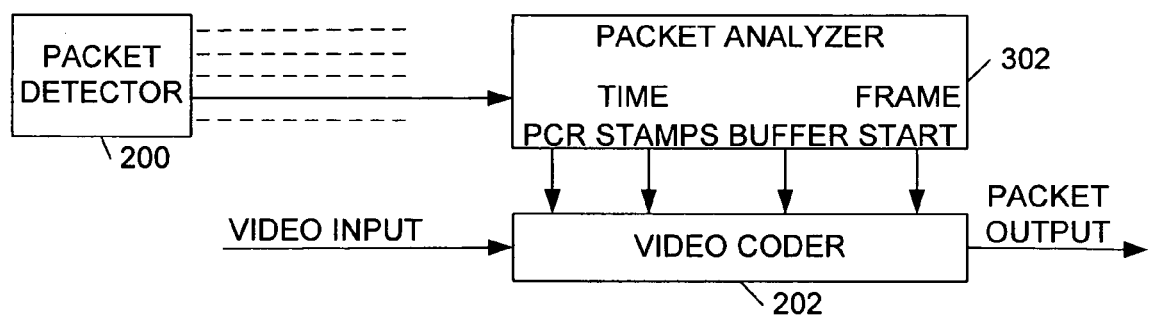
FIGS. 2 and 3 are block diagrams illustrating processes conducted in the coder of FIG. 1.

Referring to FIG. 3, the reference packets which are provided by the packet detector 200 are passed also to a packet analyser 302. Whilst the packet detector 200 will provide a reference packet output for each of the elementary streams within the tracked programme, FIG. 3—for clarity of illustration—shows only the video elementary stream.

The packet analyser 302 reads each packet, identifies a number of parameters and makes those parameters available to the video coder 202. The packets which are output by the video coder are then not only in alignment with the reference packets but also share certain key parameters. For example, the packet analyser will identify the Programme Clock Reference (PCR) in each packet and will provide this to the video coder. The analyser 302 will also identify time stamps (both presentation time stamps (PTS) and decoder time stamps (DTS) and the video coder 202 will again ensure that these time stamps are present also in the locally coded packets. The analyser 302 will also determine the Video Buffering Verifier delay (VDV_delay) and will ensure that this value, or related information concerning buffer occupancy, is passed to the video coder which uses this information to ensure that there are no discontinuities in buffer occupancy. Finally, in this example, the packet analyser 302 is adapted to identify frame starts; this information is used in the coder to ensure that there is synchronism in the frame starts between the programme to be replaced and the locally encoded programme. If there is an established protocol that a frame start will occur at a predetermined point in a packet, this location information will simply be the location of the packet containing the frame start.

There will now be described a more detailed embodiment according to the present invention. This more detailed embodiment utilises the information bus technology, referred to earlier, in which inter-alia, a decoder can make available on an information bus, information relating to coding decisions taken in the upstream encoding process.

Figure 4:
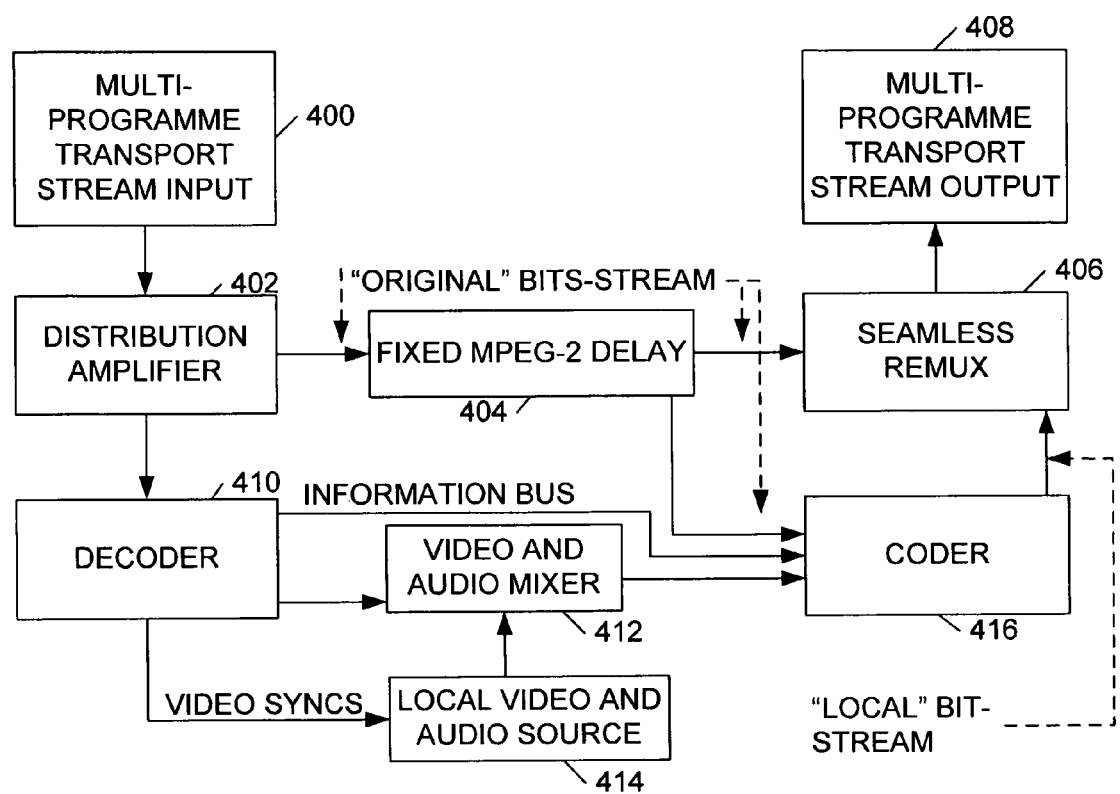
FIG. 4 is a block diagram illustrating a further embodiment of the present invention for performing a local opt-out.

Reference is now directed to FIG. 4. A multi-programme transport stream input 400 is taken to a distribution amplifier 402 which provides the MPTS input through a fixed MPEG-2 delay 404 to a remultiplexer 406. This remultiplexer provides a multi-programme transport stream output 408 which in the case where there is no local opt-out in effect, corresponds to the MPTS input, subject to a fixed delay. The distribution amplifier 402 also makes the transport stream available to a decoder 410. This is arranged to decode the particular programme in the multi-programme transport stream which it is required to replace. Decoding of the programme to be replaced is useful in that it enables fades or other digital effects to be provided at the splice points, rather than a simple switch from one programme into the next. Thus, the decoded video and audio from the decoder 410 are passed to a video and audio mixer 412 which also receives the output of the local video and audio source 414. Sync signals are taken from the decoder 410 to ensure synchronisation of the local video and audio source 414.

The output from the video and audio mixer 412 passes to the coder 416. As with the previous embodiment, this coder also receives as a reference input the multi-programme transport stream input. Additionally, because the decoder 410 is of the type arranged to provide an information bus output, the coder 416 can utilise both the transport stream reference input and the information bus to ensure that the packets which are output by the coder 416 are capable of seamless remuxing in multiplexer 406 with the remaining packets of the multi-programme transport stream.

Transport packets are too frequent to be able to convey their timing in the information bus, so the "reference" MPEG-2 transport stream input is used for this purpose, in the manner previously described.

Other co-alignment issues for the "local programme opt-out" application are described below. These also illustrate the practical use of the "reference" MPEG-2 bit-stream input to the local coder 416 in FIG. 4.

Even when using the video information bus technology to extract coding decisions, unavoidable rounding variations in the DCT make it impossible to guarantee encoding of an elementary stream to exactly the same number of bits as in the "upstream" encoder. An arrangement such as FIG. 5, uses control logic within the coder 416 employed to align locally encoded access unit (AU) headers with corresponding AU headers in the reference transport stream.

Figure 5:
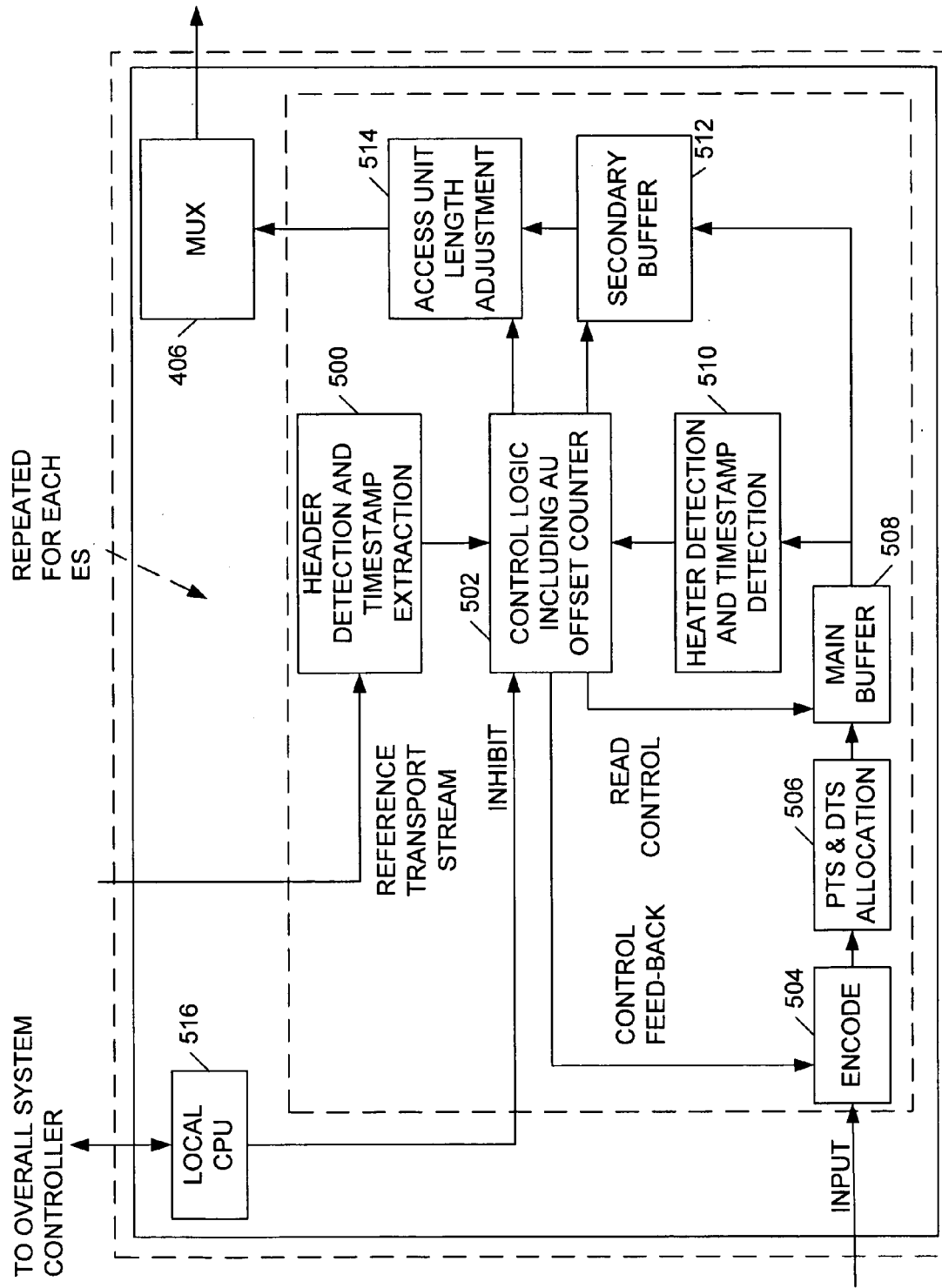
FIGS. 5, 6 and 7 are block diagrams illustrating processes conducted in the circuitry of FIG. 4.

FIG. 5 is a generalised outline for a non-specific elementary stream. It shows the extraction of AU headers and timestamps (DTSs and PTSs) from the "reference" input. To allow the "control logic" block to calculate the relative timing of "local" and "reference" AUs, AU headers and timestamps are also extracted from the local video input using a form of the information bus technology which has been extended to carry timestamps.

In more detail, the reference transport stream input is taken to a header detection and time stamp extraction block 500 which provides an input to a control logic block 502. The corresponding elementary stream of the local programme is encoded at block 504, there being an appropriate control feedback from the control logic block 502. The output of the encoding process passes to a timestamp (PTS and DTS) allocation block 506 and to a main buffer 508. A second header detection and timestamp extraction unit 510 operates on the buffer output, to provide the second input to the control logic 502. Real control of the main buffer is effected by the control logic 502. The output of the main buffer passes through a secondary buffer 512 and through an access unit length adjustment block 514, both of these blocks being under control from the control logic 502. The output of the access unit length adjustment block 514 is then made available to the remultiplexer 406.

The "access unit length adjustment" function shown is only needed where a particular ES has AUs of unpredictable length (so that encoded AUs in the "local" programme are not guaranteed to be the same length as in the "original" one). This length adjustment may be performed, for example, by controlling quantisation and by inserting ES padding.

The AU co-alignment implementation described above offers a way to automatically set the "fine" timing of the "local" data path. This is because after the timestamps have been matched up and a local AU header has then arrived before the corresponding one from the reference stream, reading from the local video buffer stops until an AU header arrives from the reference stream. This has the effect of fine-tuning the "local path" delay by changing the local main video ES buffer level.

The AU length adjustment process just described can then be run through once after coder power-up to fine-tune the video ES buffer level before attempting any seamless switching.

In addition to the "fine-tuning" just described, the AU co-alignment architecture described above offers a way to set the "coarse" MPEG-2 delay timing during system installation. This is done in a special set-up mode ("delay coarse adjust" mode) in which all co-alignment is inhibited. Timestamps are extracted in blocks 500 and 510 in FIG. 5 and sent via the "local CPU" 516 to the overall system controller. This can then subtract the timestamps and set the "MPEG-2 delay" accordingly. This time difference extracted from the timestamps sets the MPEG-2 delay tap which feeds the coder. The MPEG-2 delay tap which feeds the Seamless Remux can then be set to the same value plus a fixed offset for the remaining path delay difference between the two Seamless Remux inputs in FIG. 5.

The ability to automate system data path delay set-up in this way shows a benefit of using the information bus and the "reference" MPEG-2 input together at the MPEG-2 encoder.

When a switch between bypass and local paths is about to take place, the encoded data within every ES representing the same uncompressed content must be in the same AU in the "local" encoded programme as it is in the "original" one.

For video, co-aligning content requires the arrangement already shown in FIG. 5. This shows control logic within the local coder time-aligning locally-encoded AUs with corresponding AUs in the "reference" transport stream. This gives complete content co-alignment for the video by using its inherent picture boundaries.

Similar methods may be used to co-align audio and data services.

When a switch between bypass and local paths is about to take place, the decoder buffer levels (in decoders downstream of the whole local opt-out system) must be the same for each ES between the "local" programme and the "original" one. This constrains the PTSs and DTSs within each local ES.

To meet this constraint, the local coder needs an internal "local" PCR which is consistent with the values passed through the information bus when they are present, and which continues to run, locked to the rate of the "reference" bit-stream PCR, when values passed through the information bus are absent (i.e. whilst the system is "opted out" to the local programme). This "local" PCR can then be used for to generate both audio and video timestamps. One possible architecture is shown in FIG. 6.

Although the ES encoding chain is separate for each ES, the local PCR offset is set using the video ES only. This is because only one ES needs to be used to correct the PCR as all ESs must share the same common resulting PCR. Comparing timestamps within all ESs would also complicate the logic. Video is chosen as the ES on which to perform timestamp comparison because it has the best-defined timing (using the Video MOLE™).

Figure 6:
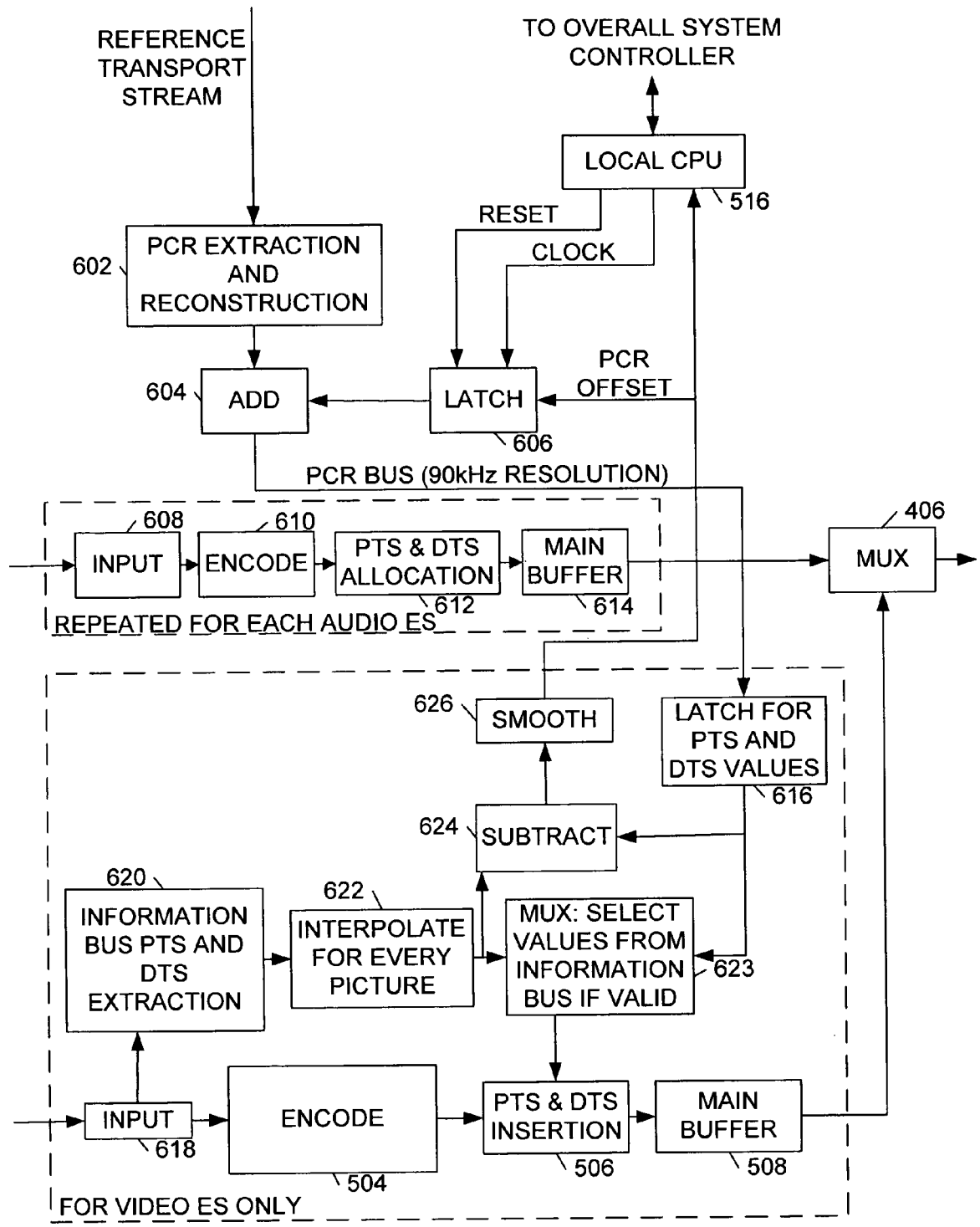

Turning to FIG. 6, the reference transport stream input is taken to a PCR extraction and reconstruction block 602, the output of which is added at 604 with the output of a latch 606. The output of the add block 604 provides a PCR bus which is made available to the audio elementary streams which take their PCR timing from the video stream. Briefly, for each audio elementary an input 608 is encoded at 610 and passes through a PTS and DTS allocation block 612 which receives the PCR bus. The output of block 612 passes through an elementary stream main buffer 614 to the multiplexer 406. The PCR bus is also latched at 616 in the processing for the video elementary stream. The input at 618 passes to an encode block 504 with extracted information bus, information passing to a PTS and DTS extraction unit 620. This provides an output which is interpolated for every picture at 622. The interpolated output passes to a multiplexer 623 which will select the values from the information bus, if these are valid, and pass them to the PTS and DTS insertion unit 506. This multiplexer also receives an input from the latch 616. The output of the interpolation block 622 also passes to a subtractor block 624, for subtraction of the values from the latch 616, with the output being smoothed at 626 and passing as a PCR offset to latch 606. This latch receives clock and reset signals from the local CPU 517.

The timestamps values for each picture may be a PTS, a PTS and DTS, or neither. If both are present then only DTSs are subtracted (in the subtract block 624 in FIG. 6) because there is no need to subtract PTSs as well (the difference between PTSs should be the same as between DTSs; the choice of DTSs over PTSs here is arbitrary).

In order for the proposed system architecture to work properly, it must be possible to subtract video timestamps for any picture, even though PTSs and DTSs may arrive at different times in the "local" and "original" programmes. The local coder always produces timestamps for every picture (within the header of the PES packet which it always produces for every picture). Just in case the "upstream" encoder does not, the arrangement of FIG. 6 interpolates timestamps for every picture from those supplied to the local coder in the information bus from the decoder 410.

PCR and "vbv_delay" values need to be co-aligned to prevent timing "hiccups" in downstream decoders when the local opt-out system performs a seamless switch.

In standalone operation the local coder produces valid "vbv_delay" values (which are only ever present within the video ES), and the timestamp co-alignment implementation described above co-aligns the PCR values used internally to the local coder. However, the "vbv_delay" and PCR values output by the local coder would still be incorrect for the following two reasons.

The AU co-alignment scheme shown in FIG. 5 introduces an ES delay in the "secondary buffer". This "padding delay" acts is in addition to the main ES buffer delay which would apply in stand-alone operation. The "padding delay" is needed as "local path" delay fine-tuning but it invalidates the "vbv_delay" values which pass through it. This is because the main video ES buffer, including the "padding delay", is a single buffer whose occupancy is used to calculate the local "vbv_delay" values.

The arrangement of FIG. 5 also adds a variable delay by holding up local AU headers during AU length adjustment, which invalidates the PCR values which pass through it by adding large amounts of jitter.

Figure 7:
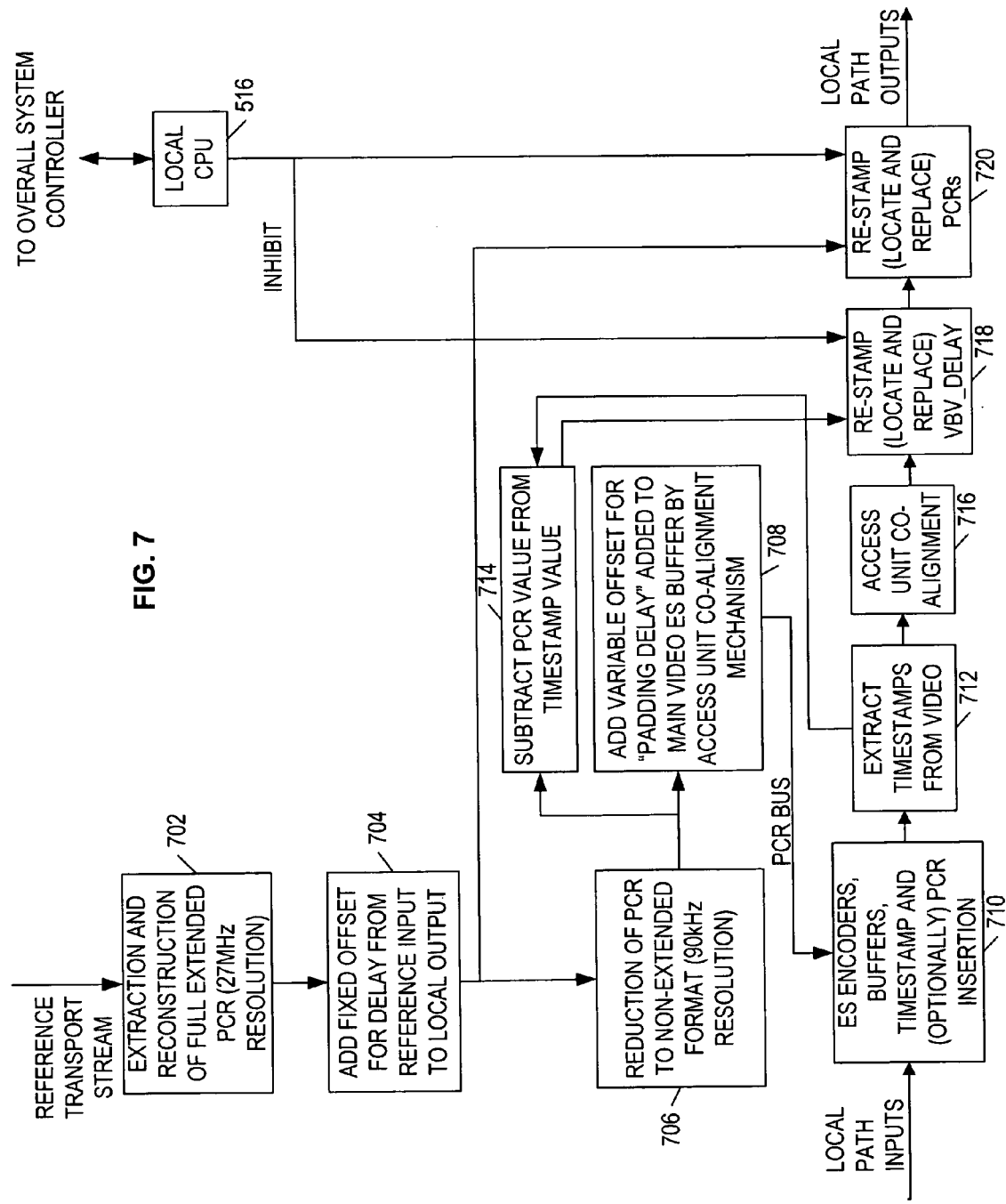

To correct for these effects, "vbv_delay" and PCR values can be re-calculated from scratch just before the output of the MPC. FIG. 7 shows one possible implementation of this "re-stamping".

The reference transport stream input is taken to block 702 where the PCR is extracted and a full PCR at 27 MHz resolution is reconstructed. This reconstructed PCR then passes through block 704 where a fixed offset is added for the delay from the reference input to the local output. The full PCR is reduced in block 706 to a non-extended format (90 kHz resolution). In block 708 a variable offset is added to compensate for the padding delay added to the main video elementary stream buffer in alignment of the packet. This provides a PCR bus which is used as shown generally in block 710 for the elementary stream encoders, buffer, timestamp and (optionally) PCR insertion. Timestamps are extracted at 712 and in block 714 the PCR value from block 706 is subtracted to provide an output in block 718. This receives the output of the access unit co-alignment block 716 and re-stamps, that is to say locates and replaces the VBV_delay. The output passes to block 720 which receives inputs from the block 704 and the local CPU 517 to re-stamp (that is to say locate and replace) PCR. The output of block 720 then forms the local path output.

The "variable offset" to the PCR bus shown in FIG. 7 is the same "offset" as is shown in FIG. 6. The "timestamp extraction" block shown in FIG. 7 is the same one used to identify each "local" video AU for AU co-alignment (the lower of the two shaded blocks in FIG. 5). The timestamp extracted from the video ES is the DTS value (or the PTS if there is no DTS) because "vbv_delay" is a time interval before decoding rather than before presentation.

Each of the preceding co-alignment mechanisms is dependent on extracting timing-related information from the "reference" input to the local coder within the local opt-out system. Co-alignment of each parameter is vital to guarantee that the "local opt-out" can be seamlessly switched in and out, i.e. without artefacts at "downstream" decoders.

In addition, the "reference" input has been shown to allow automatic system data path delay equalisation when used in conjunction with the information bus technology.

In the preceding examples, attention has been focussed on the situation in which it is desired to replace one programme in a multi-programme transport stream. This is not the only use, however, of a reference transport stream input according to the present invention. There are situations, for example, in which it will be useful to use a single transport stream reference input to control a compression unit, either an encoder or a transcoder. In a more radical departure, it will be useful in certain cases to employ a reference transport stream input which is not taken from a "real" multi-programme transport stream, but is artificially generated, purely as a reference. An example will make this clearer.

It is a common requirement to multiplex a number of single programme transport streams with dynamic allocations of bitstreams according to the content or priority of the respective single programme transport streams. So-called statistical multiplexers are available which have elaborate control links with the single programme transport stream encoders to enable the required dynamic allocation of bit-rates. In certain circumstances, a programme encoder will be remote from the multiplexer with no control loop being feasible. The single programme transport stream may, for example, exist in encoded form on a file server. In such a case, it will be preferable to pass the encoded transport stream through a transcoder rather than to decode the transport stream to video in one unit and then to pass the video signal to a coder unit which is capable of receiving a control signal from the multiplexer. There will be other situations where the requirement to receive a specific format of control signal from a statistical multiplexer will represent an undesirable constraint.

Figure 8:
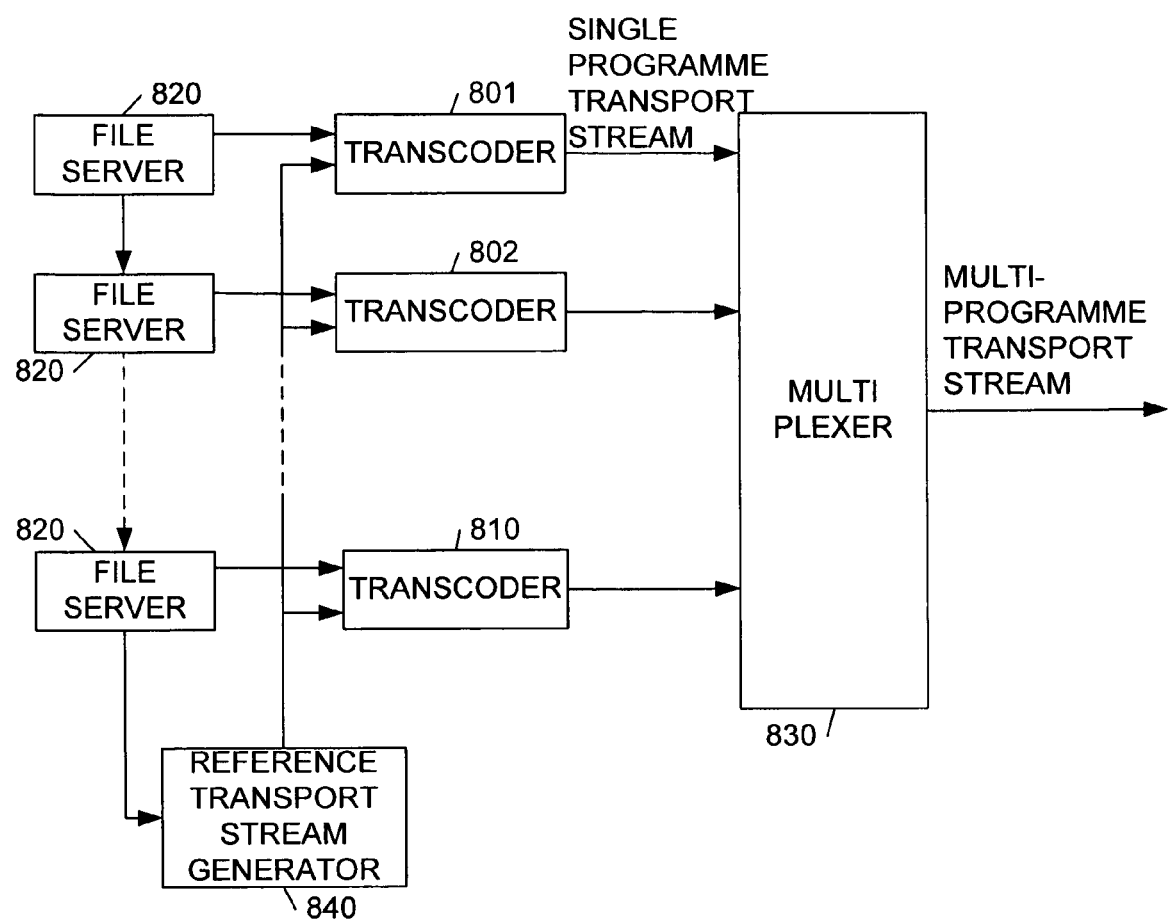
FIG. 8 is a block diagram illustrating a further embodiment of this invention for multiplexing.

Turning now to FIG. 8, there is shown an arrangement in which a series of transcoders 801 to 810, each receives a single programme transport stream from a file server 820. The single programme transport streams from the transcoders are multiplexed at 830 to form a multi-programme transport stream.

A reference transport stream generator 840 generates what might be termed a template for the multi-programme transport stream output of the multiplexer 830. Within this reference multi-programme transport stream, reference packets will be allocated to the specific programmes and the number of packets allocated per unit time to a specific programme will effectively set the instantaneous bit-rate output for the transcoder for that programme. Since the transcoders which supply the multiplexer 830 are all constrained to provide packets in alignment with the reference transport stream, it is ensured that the overall desired bit-rate for the multi-programme transport stream output (whether fixed or variable) is always complied with. Moreover, since the nature of this control does not rely on feedback loops from the multiplexer to a coder, there is no requirement to allow a safety margin in the bit-rate allocation to account for control delays and tolerances. This will ensure optimal use of the available output bit-rate. The use of a transport stream reference has a further advantage that a well-documented and easily reproducible control input is employed, rather than a proprietary control loop.

Each transcoder will typically comprise a decoder and an encoder linked using information bus technology so as to avoid cascade loss. The encoder stage will then employ the reference transport stream input and the information bus signal in a manner analogous to that previously described so as to provide a single programme transport stream output which has packets aligned with the nominated packet of the reference transport stream input. Moreover, the individual packets of the single programme transport stream will taken parameters (such as the PCR and timestamps) from the nominated packets of the reference transport stream input.

The reference transport stream generator 840 may receive information concerning the SPTS's from the file servers or from the transcoders. It will typically also receive external control signals.

One particular example of use of the arrangement of FIG. 8 where control of the reference transport system generator 840 is especially straightforward is for Near Video on Demand (NVOD). Here the various single programme transport streams are time-shifted version of each other.

It will be understood that this invention has been devised by way of examples only and a wide variety of further modifications are possible within objects from the scope of the invention.

The invention claimed is:

1. Apparatus for forming a multi-programme transport stream having a fixed overall bit rate and in which the instantaneous allocation of that bit rate amongst the programme transport streams is controllable, comprising a plurality of programme compression units each having a reference input; a controller which generates a transport stream reference having sets of reference packets associated respectively with the respective compression units, in which the relative occurrence of packets of the respective sets reflects the desired instantaneous allocation of that bit rate amongst the programme transport streams, each compression unit receiving the transport stream reference and being arranged to output packets in alignment with the reference packets associated with that compression unit and a multiplexer which combines the outputs of the respective pro gramme compression units to form a multi-programme transport stream.

2. Apparatus according to claim 1, wherein the programme compression unit comprises a compression encoder receiving an uncompressed input.

3. Apparatus according to claim 1, wherein the programme compression unit comprises a compression transcoder receiving a compressed input.

* * * * *